United States Patent [19]
Keyes et al.

[11] 3,854,696
[45] Dec. 17, 1974

[54] FLUID FLOW VALVE
[75] Inventors: John Harold Crawford Keyes, Corbridge; George William Napier, Newcastle upon Tyne, both of England
[73] Assignee: Jas. Young & Cunningham (Newcastle) Limited, Killingworth Township, Newcastle upon Tyne, England
[22] Filed: Dec. 14, 1972
[21] Appl. No.: 315,005

[30] Foreign Application Priority Data
Dec. 14, 1971 Great Britain.................... 58085/71

[52] U.S. Cl............................. 251/163, 251/188
[51] Int. Cl............................................ F16k 5/20
[58] Field of Search........... 251/160, 161, 162, 163, 251/188

[56] References Cited
UNITED STATES PATENTS
3,319,925  5/1967  Kojima........................... 251/252 X
3,477,690  11/1969  Murota............................. 251/163
3,627,259  12/1971  Williams........................... 251/163

Primary Examiner—Harold W. Weakley

[57] ABSTRACT

A fluid flow butterfly valve having positive seating with a vertical movement of the valve shaft producing a movement of the valve disk against or from the seating, by means of reaction of members attached to the valve disk against inclined slots in the valve shaft, rotation of the valve shaft rotating the valve disk in the flow path, the motion of the valve shaft being controlled by an actuator mechanism, by which rotational movement of a handwheel is translated into sequential axially-linear and rotational movements.

1 Claim, 5 Drawing Figures

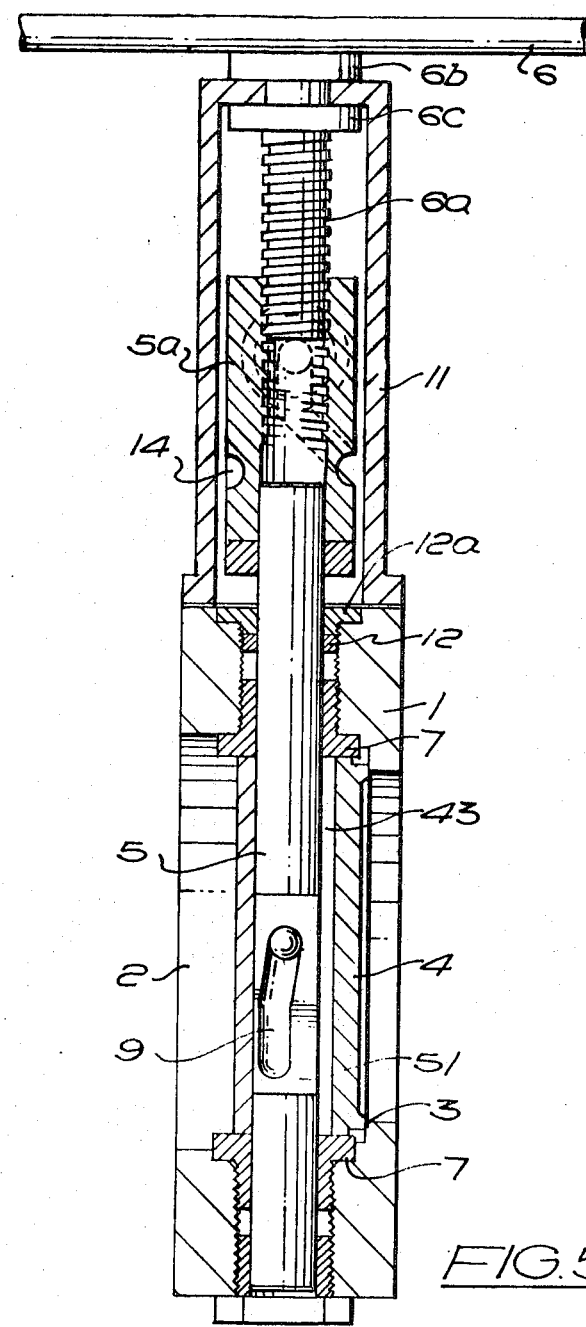

FLUID FLOW VALVE

This invention relates to a fluid flow valve of the kind having a valve body defining a fluid flow passage, a valve seat in the body partially defining the fluid flow passage, a spindle carried in the body transversely of the fluid flow passage, a disk extending transversely of the flow passage and having a front surface for cooperating with the valve seat in a closed condition of the valve, operative means connected between the spindle and the back of the disk for lifting the blade from the valve seat axially of the fluid flow passage and for rotating the disk in the fluid flow passage into an open condition of the valve and vice versa in response to operation of the spindle.

BACKGROUND TO THE INVENTION

In fluid flow valves of the kind referred to spring means have been operative for lifting the disk from the valve seat and in one such proposal a cam is mounted on the spindle and a pair of cross pieces bear across the spindle, one on each side of the cam, each cross piece slidably engaging by its end portions a pair of headed projections extending from the back of the disk, a projection of each pair of projections being disposed on each side of the spindle, compression springs are interposed between the heads of the projections and the respective end portions of the cross pieces whereby the back of the disk is urged against the periphery of the cam and on initial rotation of the spindle the cam coacts with the back of the disk so that the springs urge the disk towards the spindle to lift the disk from a closed condition on the valve seat whilst further rotation of the spindle carries the disk round with it to effect quick opening of the valve and conversely quick closing thereof when the spindle is rotated in the opposite direction.

SUMMARY OF THE INVENTION DISCLOSURE

An object of the present invention is to provide for positive lifting of the disk from the valve seat so that the valve can be opened under conditions where fluid pressure on the back of the disk is greater than the pressure exerted by the springs.

Another object is to facilitate enclosure of the guides and guidemembers of the valve mechanism for opening and closing the butterfly valve of the present invention.

According to the invention, a spindle shaft has a pair of axially extending curved recesses disposed one on each of oppositely directed faces of the spindle, opposite from one-another, each having a guide bearing seated in the groove and held therein by a concavely shaped terminal of a grub screw, with each grub screw mounted through one of two space-apart parallel support structures mounted commonly on the back of a blade of a butterfly valve. With such a disk mounting, the spindle shaft is movable axially before eventually turning the blade by rotary force imparted to the disk through the guide bearings.

According to the invention a fluid flow valve of the kind referred to comprises: a first set of two spindle first opposed faces provided on the spindle, one of the first opposed faces being disposed between the other first opposed face and a back surface of the disk, at least a part of the first sets of first opposed faces being disposed angularly with respect to the spindle and the back surface of the disk; and a guide member provided on the back of the disks and having a set of second opposite faces respectively slidable over the opposed faces between which they locate the guide member.

Two or more first sets of the first opposed faces and a corresponding number of second sets of the second opposite faces may be provided and the first opposed faces of a first set may define a slot extending in-part axially-longitudinally of the spindle and in-part helically inclined of the spindle; in this case, operative means are provided for axially moving the spindle for lifting the disk from the valve seat and then rotating the spindle and thereby also rotating the disk whereby the first opposed faces are inclined towards a front surface of the disk in the direction in which the spindle is axially movable such that the front face of the disk is pressed laterally onto the valve seat, relative to the spindle longitudinal axis of movement.

The spindle may be screw threadedly engaged with a rotatable actuator which may be provided with a handwheel.

A collar, which may house a threaded shaft portion of the actuator and the adjacent end portion of the spindle, may be mounted on the valve body and locate the actuator by engaging between two annular guides thereon, a guide on the collar engaging in an armed slot in the spindle, an axially extending arm of the slot having a length corresponding to the height of the inclined slot in the spindle, and continuing into a spiral arm of the slot. An internally threaded guide sleeve may be fixedly secured as part of the end portion of the spindle and screw threadedly engaged by a helically threaded axis of a threaded shaft of the actuator. Two or more guide elements may be provided together with a corresponding number of angular guide slots in the guide sleeve.

The disk may be carried in the valve body and/or on the spindle, a block being provided on or formed integrally with the back of the disk for carrying opposite faces and preferably slidably locating the disk on the spindle. The block may surround and usually encloses the spindle for minimizing obstruction of the fluid flow passage in the open condition of the valve.

Location-mounting members such as sleeve bearings may be provided in the valve body one each side of the disk, for example one at each end of the block, for locating the disk longitudinally of the spindle with respect to the flow passage. In use the disk slides laterally, longitudinally of the flow passage, against the location members.

Rotation of the actuator moves the spindle axially for moving the disk longitudinally of the flow passage onto and away from the valve seat by sliding of the guide members in the inclined slots and sliding of the guides when provided, in the axial arms of the armed slots.

Preferably the spiral arms of the armed slots of the actuator assembly extends longitudinally thereof away from the axial arms and the inclined slots are extended from the corresponding ends furthest from the from the disk by a height corresponding to the height of the spiral arms.

The guide members may comprise a ball or balls, and the inclined slots in which it or they slide are preferably extended in an axial direction of the spindle by a distance corresponding to the height of the helically threaded axis of the guide sleeve.

After moving the disk away from the valve seat further rotation of the actuator rotates the spindle and thus the disk by sliding the guides in the spiral arms of the armed slots and sliding the guides in the longitudinal extensions of the inclined slots.

The inclined slots with the longitudinal extensions may be provided in the form of angled slots for lifting the disk clear of the seat and accommodating further axial movement of the spindle as it rotates the disk. Armed slots of the actuator assembly will then be correspondingly angular.

The spindle may be strengthened adjacent the guide member by the disk, for example having a square section with an extended inclined slot on both sides.

Provision of the slots on the inner member is preferred since this facilitates enclosure of the guides and guide members.

The balls used as guides and guide members are conveniently supported by grub screws with arcuate inner faces against slots of arcuate cross section.

The blade disk and the valve seat preferably provide positive metal to metal contact in the closed condition between the valve slide structure and spindle angular-slot structure and intermediate force-transmitting structure thus minimizing deterioration due to the effects of corrosive and/or hot fluids. The disk is sequentially first withdrawn from the seat and then secondly quickly rotatable through 90° to a fully open condition.

The invention will be further described by way of example with reference to the accompanying drawings.

THE FIGURES

FIG. 5, is a section on the line X—X of FIG. 1. showing the valve closed.

DETAILED DESCRIPTION

Figure 1:
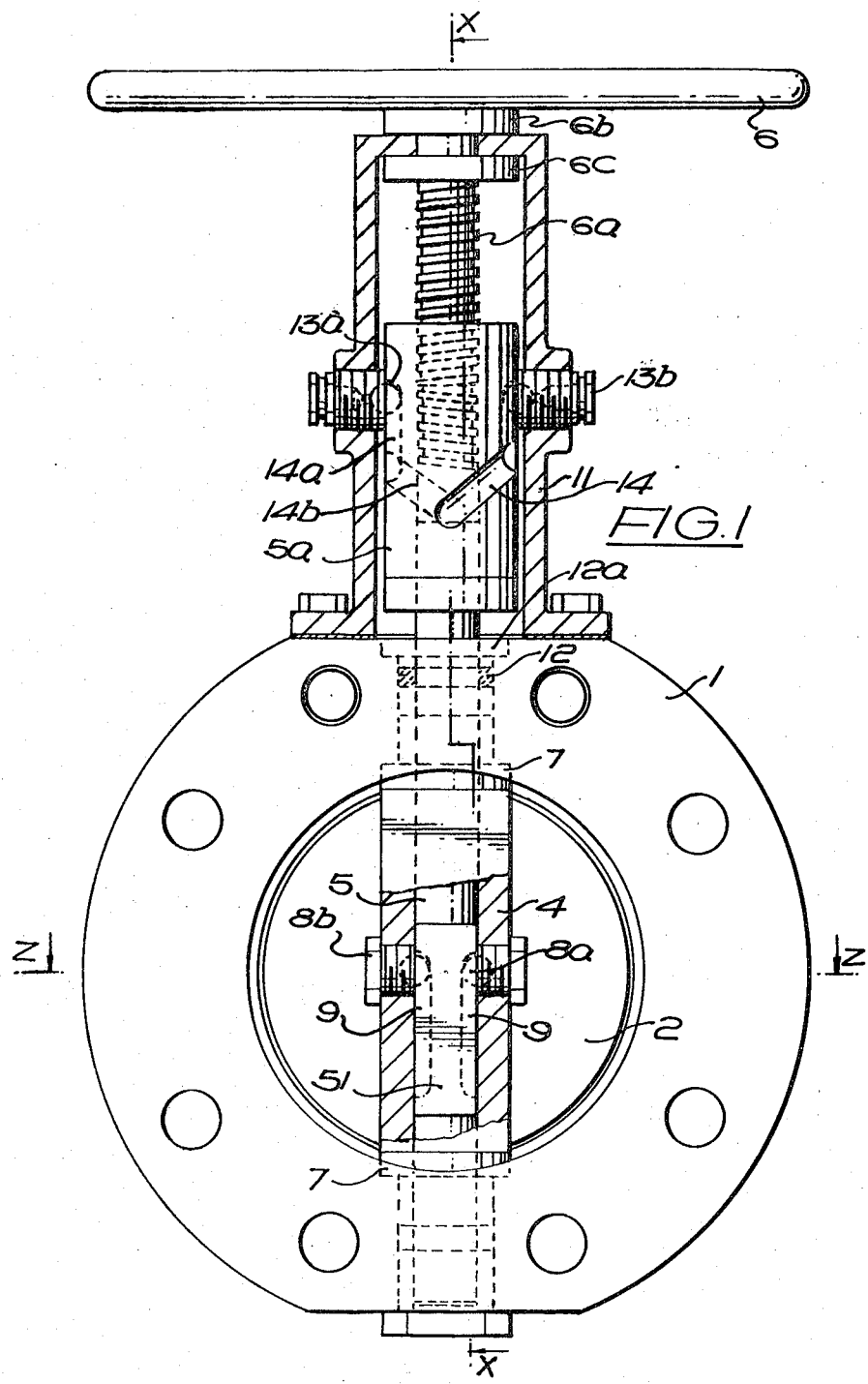
FIG. 1 is a partial section through a fluid flow valve according to the invention.
Figure 2:
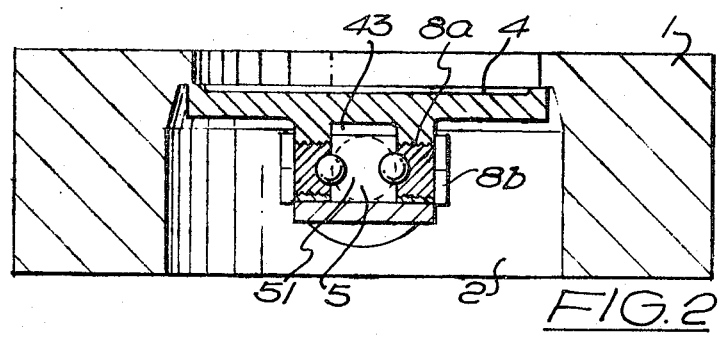
FIG. 2 is a section on the line Z—Z of FIG. 1, showing the valve closed.

In the drawings like reference numerals denote like parts.

A valve body 1 comprises a fluid flow passage 2 and a valve seat 3 partially defining the flow passage. A disk 4 carried by a spindle 5 extends transversely of the flow passage 2, One end portion of the spindle 5 extends transversely through the flow passage 2 and its other end portion is operatively connected to a rotatable handwheel 6.

Figure 3:
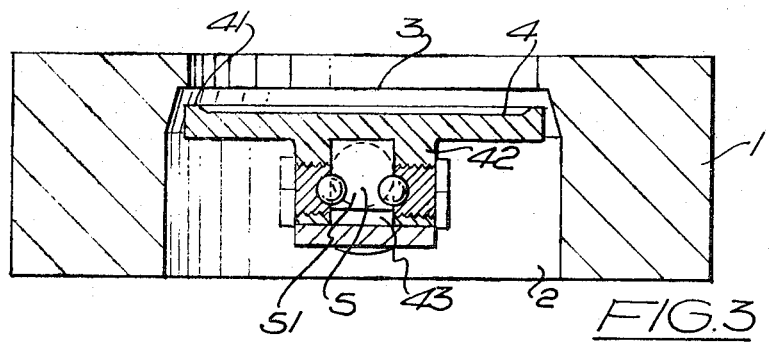
FIG. 3 is a section on the line Z—Z of FIG. 1.. showing the blade lifted from its valve seat before rotation.
Figure 4:
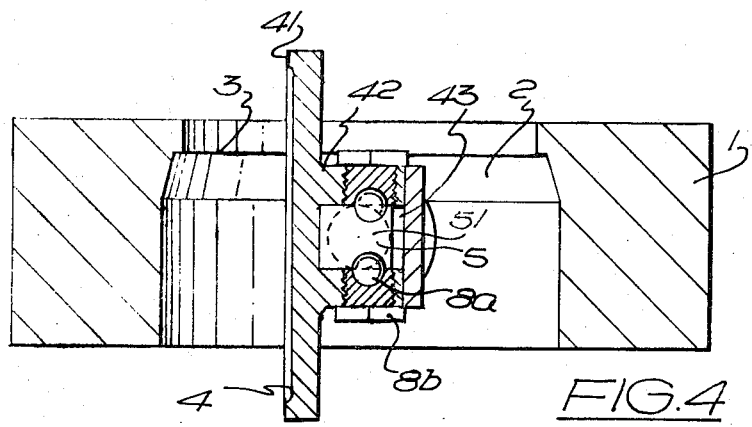
FIG. 4, is a section on the line Z—Z of FIG. 1, showing the valve fully opened.

The valve disk 4 includes a front surface 41 which contacts the valve seat 3 in the closed position of the valve (FIGS. 3 and 4) and an integral block 42 extends from the back of the disk 4. Location members such as sleeve bearing 7, (FIGS. 1 and 5) are provided on the spindle 5 each one side of the block 42 to correctly locate the valve disk 4 in the flow passage 2.

A bore 43 extends longitudinally of the block 42 integral with the rear surface of the valve disk 4 for accommodating the said one end portion of the spindle 5 and permitting lateral sliding of the valve 4, longitudinally of the flow passage 2 over the spindle when the valve is adjacent its seat 3.

The spindle is reinforced by being formed with a portion 51 of rectangular section on opposed sides of which slots 9 of arcuate section are provided, engaged by balls 8a mounted in grub screws 8b in the block 42 on the back of the disk 4.

The spindle 5 is operatively connected to an actuator assembly comprising a collar 11 whereby the spindle 5 is liftable and rotatable in the collar 11 in response to rotation of the handwheel 6 sequentially to withdraw the disk 4 from its seat 3 in a direction parallel with the flow passage 2 and then rotate the disk 90° in the flow passage, and vice versa.

The collar 11 is formed by a housing surrounding the spindle 5 and which is sealed relative to the valve body by a gland 12 held in position by a gland retainer plate 12a. The collar 11 axially locates the handwheel 6 and threaded shaft 6a by slidable engagement between two annular members 6b, 6c provided on the threaded shaft 6a.

The collar 11 and spindle 5 are connected by engagement of balls 13a, mounted in grub screws 13b in the collar 11, in angular slots 14 of arcuate cross section formed in the sleeve 5a, each slot 14, having an axial arm 14a and an angularly disposed circumferential arm 14b.

The hand wheel 6 is disposed above the collar 11 and provided with a threaded threaded shaft 6a extending into the collar 11 where its inner end is in threaded engagement with guide sleeve 5a connected as part of the spindle 5 which is sequentially lifted and rotated (and vice versa) in response to rotation of the handwheel 6 to control the valve disk 4.

In use rotation of the handwheel 6 from the closed position raises the spindle 5 and causes the balls 13a to be raised in the axial arms 14a of the slots 14 in the guide sleeve 5a. The balls 8a in the disk 4 are simultaneously raised with respect to the inclined slots 9a which withdraws the disk 4 from the seat 4 as the balls 8a progressively travel along the slots 9a.

Further rotation of the handwheel 6 causes the balls 13a to follow the circumferential arms 14b of the slots 14 and rotate the spindle 5. Consequently the balls 8a are rotated to rotate the blade 4 and progressively and quickly to open the flow passage.

We claim:

1. In a butterfly valve device in which the butterfly valve disk is movable transversely of an axis of rotation of the valve disk prior to rotation of the valve disk when opening the valve device by the turning of a handle-shaft means comprising a valve-shaft to which the valve disk is operatively rotatably attached for rotation therewith, including a flow conduit housing for the valve disk with the flow conduit housing providing a valve seat for the valve disk and providing a stem port with the valve shaft extending axially therethrough and rotatable therein and sealed therein against leakage, and including the valve shaft being movable initially axially and then rotatably during the turning of a handle to open the valve disk to a valve -open position, and with the valve-shaft being operatively connected at one end thereof to the valve disk such that initial axial movement of the valve-shaft causes the valve disk to move laterally away from its valve seat of the flow conduit housing and causes the valve disk after the lateral movement to move with the valve-shaft rotatably in valve disk opening action; the improvement in combination with the valve disk, the handle-shaft means and valve-shaft thereof, and the flow conduit housing with its valve seat and with its stem port, comprising: the valve disk having opposite substantially flat faces extending in substantially parallel planes, the shaft extending in a direction substantially parallel to the planes of said valve disk's opposite flat faces, there being a cylindrically shaped sleeve structure having the valve-shaft fixedly secured thereto and extending axially from a lower end of the sleeve structure and having an axially extending bore within an upper end of the sleeve structure with the bore being threaded with female threads; a collar housing structure defining a handle-shaft port at an upper end thereof, a base-valve port through which the valve-shaft is extendable upwardly before its connection with a lower end of the sleeve structure, the handle-shaft port and the base-valve port being axially aligned with the stem port, and a side port aligned radially to a cylindrical side of the cylindrically shaped sleeve structure, the collar housing structure being fixedly mounted to said flow conduit housing in surrounding relation to said cylindrical sleeve structure; bearing means mounted within said side port having a ball-bearing structure extending radially inwardly within the collar housing structure, said bearing means being removably mounted in said side port; said cylindrically shaped sleeve structure defining in its cylindrically shaped outer wall two serially consecutive first and second grooves, a first groove being an upper groove extending axially downwardly a first predetermined distance, and continuous with the lower end of the first groove the second groove extending helically downwardly, the width and size of the respective first and second grooves being of predetermined dimensions for accommodatingly receiving slidably along the grooves the ball-bearing structure such that upon the sleeve structure being moved axially upwardly, the sleeve structure moves non-rotatably upwardly as the ball-bearing structure slidably rides along the first groove from an upper to a lower end thereof, and such that upon the structure being moved further upwardly, the ball-bearing structure rides in the helical second groove, whereby during the initial upward movement of the sleeve structure the valve-shaft moves axially upwardly, to withdraw the valve disk from the valve seat and whereby during subsequent helical upward movement of the sleeve structure, the valve-shaft rotates the valve disk to a valve-open position; and the handle-shaft means further including a helically threaded male handle-shaft mounted within said handle-shaft port for rotation therein and mounted against axial movement within said handle-shaft port, a lower end of the helically-threaded male handle shaft being meshably engaged within the female-threaded axial bore of the sleeve structure; and including handle-structure fixedly mounted on the upper end of said male handle shaft; and including parallel flanges extending parallel to each other and spaced from one another a predetermined spacing-distance, formed on and extending perpendicularly outwardly from one of said parallel faces of the valve disk, said flanges each defining therein bearing means directed toward and spaced from the bearing means of the opposite parallel flange, with the bearing means of the respective parallel flanges being substantially axially aligned with one another; and the valve-shaft having the end having the valve disk attached thereto on each of opposite sides of a rectangular formed section thereof third and fourth grooves serially continuous, the third grooves being upwardly located and inclined downwardly, the third and fourth grooves of each of the opposite rectangular surfaces respectively being of predetermined guide dimensions receivable and slidable therein of the respective opposite flange bearing means, such that during initial axial upward movement of the shaft, and valve disk is moved away from the valve seat, and the fourth grooves being continuous with a lower end of the third grooves, the fourth grooves extending axially downwardly such that rotary movement of the valve-shaft rotates therewith the valve disk, the parallel flanges and the valve-shaft oppositely located sides of the rectangular section defining the third and fourth grooves being tightly fitted with one another such that the bearing means of the respective parallel flanges are closed from environmental fluid flowing through the conduit housing, and additionally enclosing connecting structure extending between the opposing parallel flanges on said valve disk such that the valve-shaft is substantially circumscribed in juxtaposition to the third and fourth grooves.

* * * * *